(12) United States Patent
Huang

(10) Patent No.: US 12,092,308 B2
(45) Date of Patent: Sep. 17, 2024

(54) TIRE INFLATOR FOR VEHICLES

(71) Applicant: Tao Huang, Ningbo (CN)

(72) Inventor: Tao Huang, Ningbo (CN)

( * ) Notice: Subject to any disclaimer, the term of this patent is extended or adjusted under 35 U.S.C. 154(b) by 128 days.

(21) Appl. No.: 17/949,175

(22) Filed: Sep. 20, 2022

(65) Prior Publication Data

US 2024/0052999 A1 Feb. 15, 2024

(30) Foreign Application Priority Data

Aug. 15, 2022 (CN) .......................... 202210971450.X

(51) Int. Cl.
| | | |
|---|---|---|
| *F21V 29/74* | (2015.01) | |
| *B60S 5/04* | (2006.01) | |
| *F21V 33/00* | (2006.01) | |

(52) U.S. Cl.
CPC .............. *F21V 29/74* (2015.01); *B60S 5/04* (2013.01); *F21V 33/00* (2013.01)

(58) Field of Classification Search
CPC ............. B60S 5/04; F04B 39/12; F21V 29/74
USPC .......................................... 417/366; 137/223
See application file for complete search history.

(56) References Cited

U.S. PATENT DOCUMENTS

| | | | | |
|---|---|---|---|---|
| 4,636,230 A | * | 1/1987 | Fan ..................... | B01D 46/2403 |
| | | | | 15/345 |
| 4,656,687 A | * | 4/1987 | Wei ........................... | A47L 5/24 |
| | | | | 15/324 |
| 4,715,787 A | * | 12/1987 | Hung ...................... | F04B 35/06 |
| | | | | 417/313 |
| 4,776,766 A | * | 10/1988 | Brent ...................... | F21V 33/008 |
| | | | | 362/191 |
| 4,789,310 A | * | 12/1988 | Hung ................... | F21V 33/0088 |
| | | | | 417/313 |
| 4,829,625 A | * | 5/1989 | Wang ........................ | A47L 5/24 |
| | | | | 15/422.2 |
| 4,830,579 A | * | 5/1989 | Cheng ..................... | F04B 35/06 |
| | | | | 362/225 |
| 5,051,068 A | * | 9/1991 | Wong ...................... | F04B 35/04 |
| | | | | 417/313 |
| 5,378,119 A | * | 1/1995 | Goertzen ................ | F04B 35/04 |
| | | | | 417/313 |
| 5,568,117 A | * | 10/1996 | Hsu ......................... | B60Q 3/30 |
| | | | | 417/234 |
| 6,395,068 B1 | * | 5/2002 | Rooney .............. | B01D 53/0415 |
| | | | | 137/589 |

(Continued)

FOREIGN PATENT DOCUMENTS

| | | | | |
|---|---|---|---|---|
| CN | 203488342 U | * | 7/2013 | .............. F04B 39/12 |
| CN | 203939649 U | * | 6/2014 | .............. F04B 35/04 |
| CN | 214944849 U | * | 4/2021 | ................ B60S 5/04 |

*Primary Examiner* — Devon C Kramer
*Assistant Examiner* — Benjamin Doyle
(74) *Attorney, Agent, or Firm* — MATTHIAS SCHOLL P.C.; Matthias Scholl

(57) ABSTRACT

A tire inflator includes an inner housing, a lighting assembly, an outer housing, and an air pump; the inner housing includes a chamber; the air pump is disposed in the chamber; the air pump includes an air outlet end embedded in the inner housing and extending out of the chamber; the lighting assembly is disposed in the chamber and adjacent to the air outlet end; the outer housing surrounds the inner housing to dissipate heat; the outer housing includes a through hole; the air outlet end is disposed through the through hole; and at least a part of the lighting assembly abuts against the outer housing.

9 Claims, 7 Drawing Sheets

(56) References Cited

U.S. PATENT DOCUMENTS

| | | | | |
|---|---|---|---|---|
| 7,789,112 B1* | 9/2010 | Wise | | B60S 5/046 |
| | | | | 141/38 |
| 8,887,769 B1* | 11/2014 | Ohm | | B60S 5/046 |
| | | | | 141/38 |
| 8,925,594 B2* | 1/2015 | Ohm | | F04B 35/04 |
| | | | | 141/94 |
| 10,240,592 B2* | 3/2019 | Khubani | | F04B 39/121 |
| 11,794,426 B2* | 10/2023 | Costle | | B29C 73/166 |
| 2004/0018098 A1* | 1/2004 | Beckman | | F04B 39/066 |
| | | | | 417/373 |
| 2004/0130892 A1* | 7/2004 | Galli | | F21V 5/04 |
| | | | | 362/373 |
| 2005/0082833 A1* | 4/2005 | Sodemann | | H02J 7/342 |
| | | | | 290/1 A |
| 2008/0150473 A1* | 6/2008 | Wise | | H02J 7/342 |
| | | | | 417/313 |
| 2008/0187447 A1* | 8/2008 | Steinfels | | F04B 35/06 |
| | | | | 417/234 |
| 2011/0100503 A1* | 5/2011 | Wang | | B67D 3/0035 |
| | | | | 222/64 |
| 2013/0228316 A1* | 9/2013 | Hong | | F04B 39/066 |
| | | | | 165/121 |
| 2015/0147208 A1* | 5/2015 | Chen | | F04B 39/0094 |
| | | | | 417/423.8 |
| 2015/0322935 A1* | 11/2015 | Wang | | F04B 33/005 |
| | | | | 417/415 |
| 2015/0337825 A1* | 11/2015 | Chou | | F04B 37/18 |
| | | | | 417/415 |
| 2019/0195463 A1* | 6/2019 | Cleto | | F21S 45/47 |
| 2020/0116344 A1* | 4/2020 | Dassanayake | | F21V 17/164 |
| 2021/0075235 A1* | 3/2021 | Nook | | F02N 11/14 |
| 2021/0091578 A1* | 3/2021 | Miller | | B60S 5/046 |
| 2021/0341137 A1* | 11/2021 | Zhang | | F21V 29/51 |
| 2022/0364716 A1* | 11/2022 | Hawkins | | F21V 23/006 |

* cited by examiner

TIRE INFLATOR FOR VEHICLES

CROSS-REFERENCE TO RELAYED APPLICATIONS

Pursuant to 35 U.S.C. § 119 and the Paris Convention Treaty, this application claims foreign priority to Chinese Patent Application No. 202210971450.X filed Aug. 15, 2022. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure related to the field of inflation devices, and more particularly to a tire inflator for vehicles.

A conventional tire inflator for vehicles is a portable device and uses a pump. During the inflation process, particularly under poor light conditions, it is beneficial to illuminate the tire and chassis by a steady beam of light. When a tire inflator with a lighting assembly operates in a high-power state, more heat is generated than usual, thus adversely affecting the lighting effect.

SUMMARY

The disclosure provides a tire inflator; the tire inflator comprises an inner housing, a lighting assembly, an outer housing, and an air pump; the inner housing comprises a chamber; the air pump is disposed in the chamber; the air pump comprises an air outlet end embedded in the inner housing and extending out of the chamber; the lighting assembly is disposed in the chamber and adjacent to the air outlet end; the outer housing surrounds the inner housing to dissipate heat; the outer housing comprises a through hole; the air outlet end is disposed through the through hole; and at least a part of the lighting assembly abuts against the outer housing.

With this technical solution, the lighting assembly gives off heat and transfers it to the outer housing for heat dissipation; the inner housing is surrounded by the outer housing for maximum contact area; the air moves across the outer housing and picks up the heat accumulated in the tire inflator.

In a class of this embodiment, the light assembly comprises a lighting element, a heat dissipation element, and a thermal conduction element; the lighting element disposed in the chamber and attached to an inner wall of the inner housing; the heat dissipation element is connected to the lighting element; the thermal conduction element comprises a first end connected to the heat dissipation element and a second end connected to the outer housing.

With this technical solution, the lighting element is disposed in the chamber and attached to the inner wall of the inner housing, which prevents vibrations from transferring from the air pump to the lighting element, thus maintaining a steady beam of light.

In a class of this embodiment, the air outlet end is surrounded by a silicone grease, and the silicone grease is further attached to edges of two ends of the through hole.

With this technical solution, the heat is transferred from the air outlet end to the outer housing via the silicone grease and dissipated into the air.

In a class of this embodiment, the inner housing comprises an opening, and the lighting element is disposed towards the opening.

With this technical solution, the lighting element is disposed at the opening; the outer housing surrounds the inner housing without covering the opening and the lighting element, thus allowing more light through the opening.

In a class of this embodiment, the heat dissipation element comprises a base and a plurality of radiating ribs; the base is connected to the lighting element; the plurality of radiating ribs is spaced apart and perpendicular to the base.

With this technical solution, the plurality of radiating ribs is spaced apart on the base to increase heat dissipation.

In a class of this embodiment, the plurality of radiating ribs comprises a front rib group and a tail rib group side by side the front rib group; the base comprises a front end next to the inner housing and a tail end away from the inner housing; the front rib group comprises a plurality of first radiating ribs spaced apart on the front end; and tail rib group comprises a plurality of second radiating ribs spaced apart on the tail end; the front rib group is uneven with the tail rib group, so that a space is formed by the front rib group and the tail rib group.

With this technical solution, the space accommodates the varying sizes of air pumps, minimizing the loss of vertical size and decreasing the volume of the tire inflator.

In a class of this embodiment, the thermal conduction element comprises a first conductive end, a second conductive end, and a connection part; the first conductive end is disposed between two adjacent radiating ribs and connected to one of the two adjacent radiating ribs; the second conductive end is inserted through the opening and connected to the outer housing; the first conductive end and the second conductive end are perpendicular with respect to the connection part, and the first conductive end is not in a line with the second conductive end.

With this technical solution, the two adjacent radiating ribs increase the rate of heat transfer to the connection part.

In a class of this embodiment, the inner housing comprises first side wall comprising a plurality of first ventilation holes; the outer housing comprises a second side wall comprising a plurality of second ventilation holes; and the plurality of first ventilation holes is matched with the plurality of second ventilation holes.

With this technical solution, the plurality of first ventilation holes, the plurality of second ventilation holes, the heat dissipation element, and the outer housing constitute a heat dissipation system by which the heat is released from the tire inflator into the surrounding environment.

In a class of this embodiment, the plurality of first ventilation holes comprises a plurality of front ventilation holes and a plurality of tail ventilation holes; the plurality of front ventilation holes is closer to the lighting element than the plurality of tail ventilation holes; the plurality of tail ventilation holes is away from the lighting element; and the plurality of front ventilation holes and the plurality of tail ventilation holes form an air passage for heat dissipation.

With this technical solution, the air channel facilitates the transfer of air between the plurality of front ventilation holes and the plurality of tail ventilation holes.

In a class of this embodiment, the tire inflator further comprises a plurality of grilles disposed between the inner housing and the outer housing in positions corresponding to the at least one first ventilation hole and the at least one second ventilation hole.

With this technical solution, the plurality of grilles prevents the external debris from entering the chamber while maintaining air ventilation in the air passage, thus improving the service life of the tire inflator.

Figure 1:
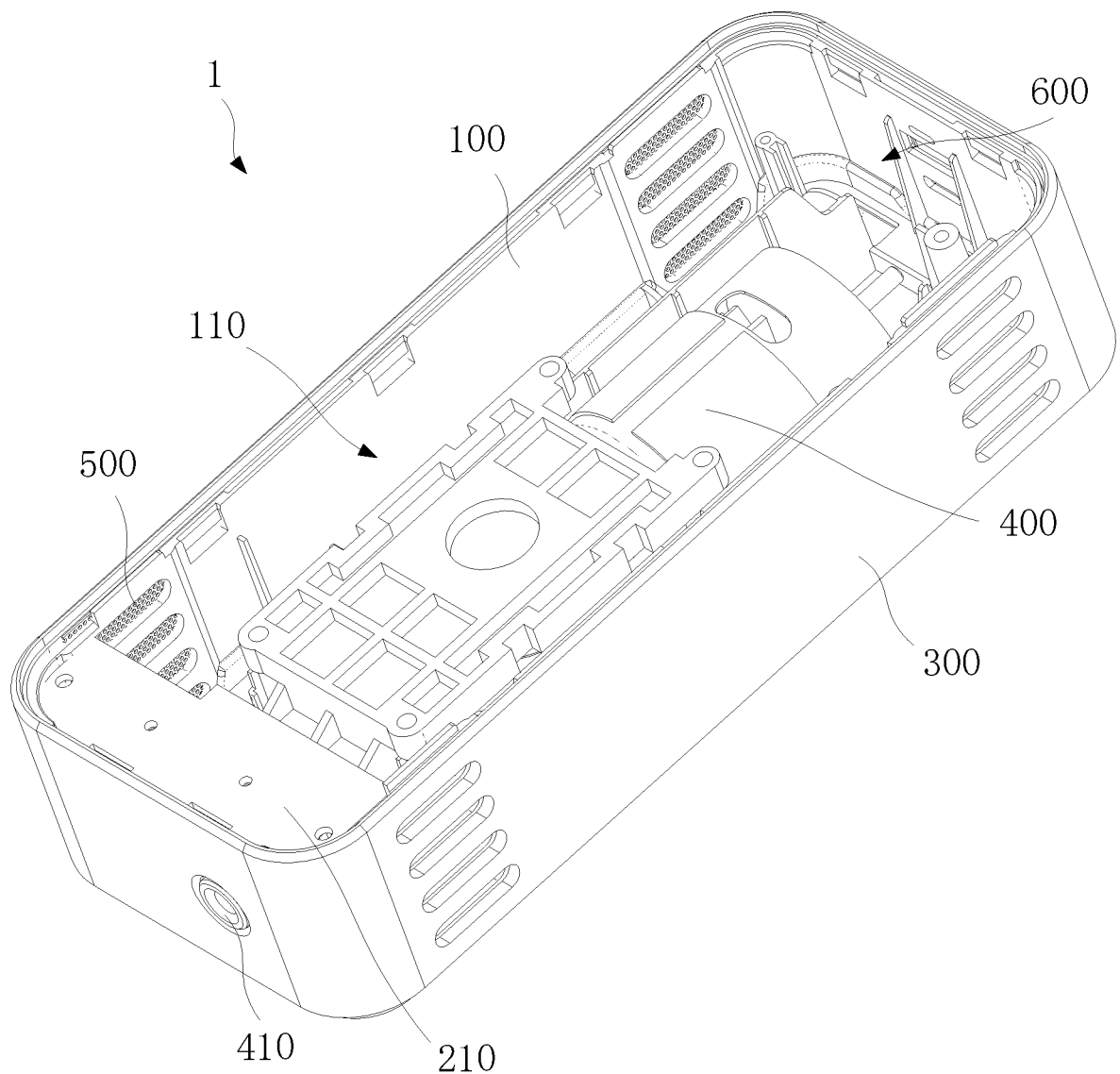
FIG. 1 is a schematic diagram of a tire inflator for vehicles according to one embodiment of the disclosure.

In the drawings, the following reference numbers are used:

1. Tire inflator; 100. Inner housing; 110. Chamber; 120. Opening; 130. First ventilation hole; 131. Front ventilation hole; 132. Tail ventilation hole; 200. Lighting assembly; 210. Lighting element; 220. Heat dissipation element; 221. Base; 222. Radiating rib; 2221. Front rib group; 2222. Tail rib group; 2223. Space; 230. Thermal conduction element; 231. First conductive end; 232. Second first conductive end; 233. Connection part; 300. Outer housing; 310. Through hole; 320. Silicone grease; 330. Second ventilation hole; 400. Air pump; 410. Air outlet end; 500. Grille; 600. First position.

DETAILED DESCRIPTION OF THE EMBODIMENTS

Example 1

Figure 2:
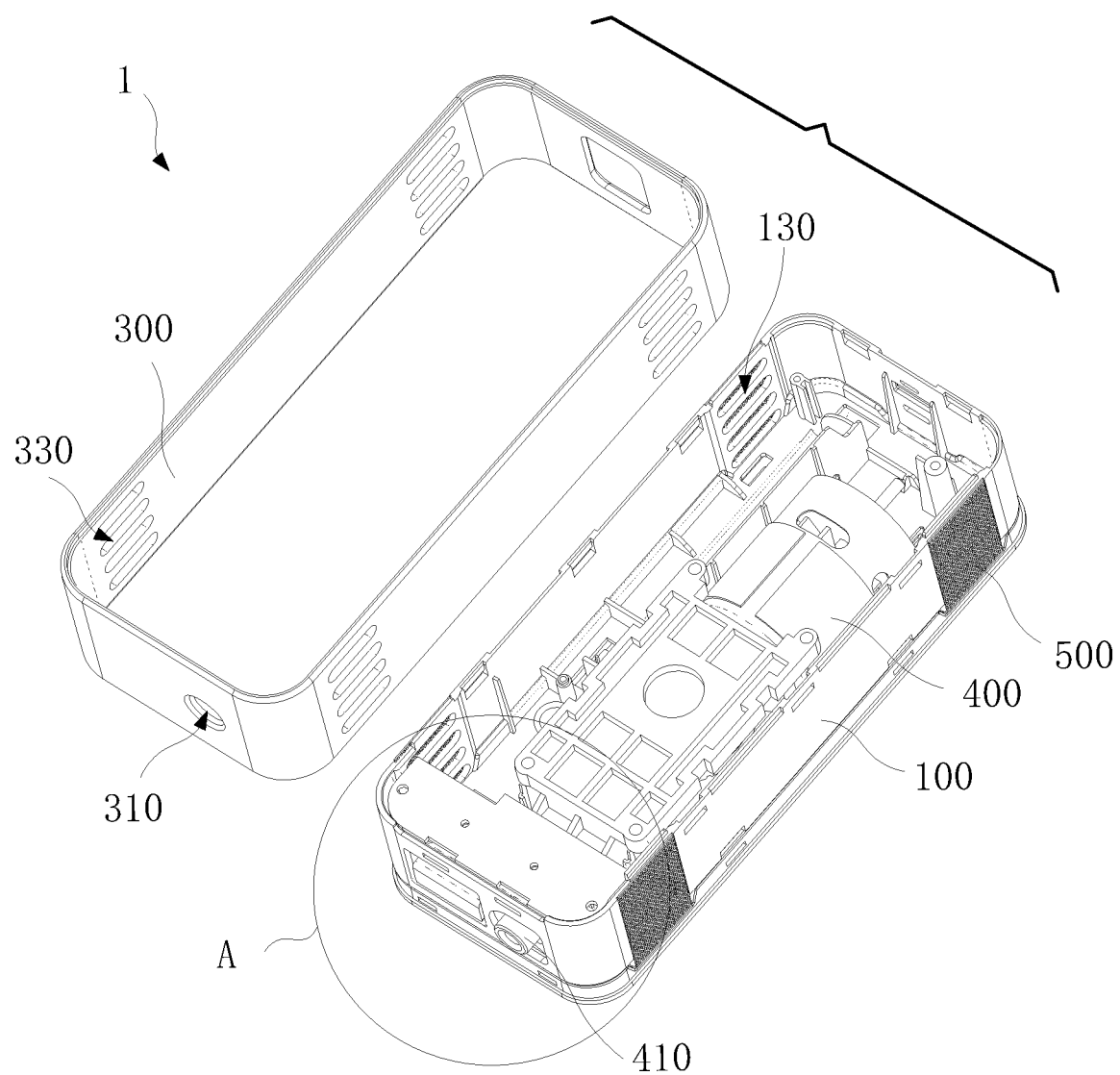
FIG. 2 is a schematic diagram of a tire inflator for vehicles according to one embodiment of the disclosure, where the outer housing is detached from the inner housing.
Figure 3:
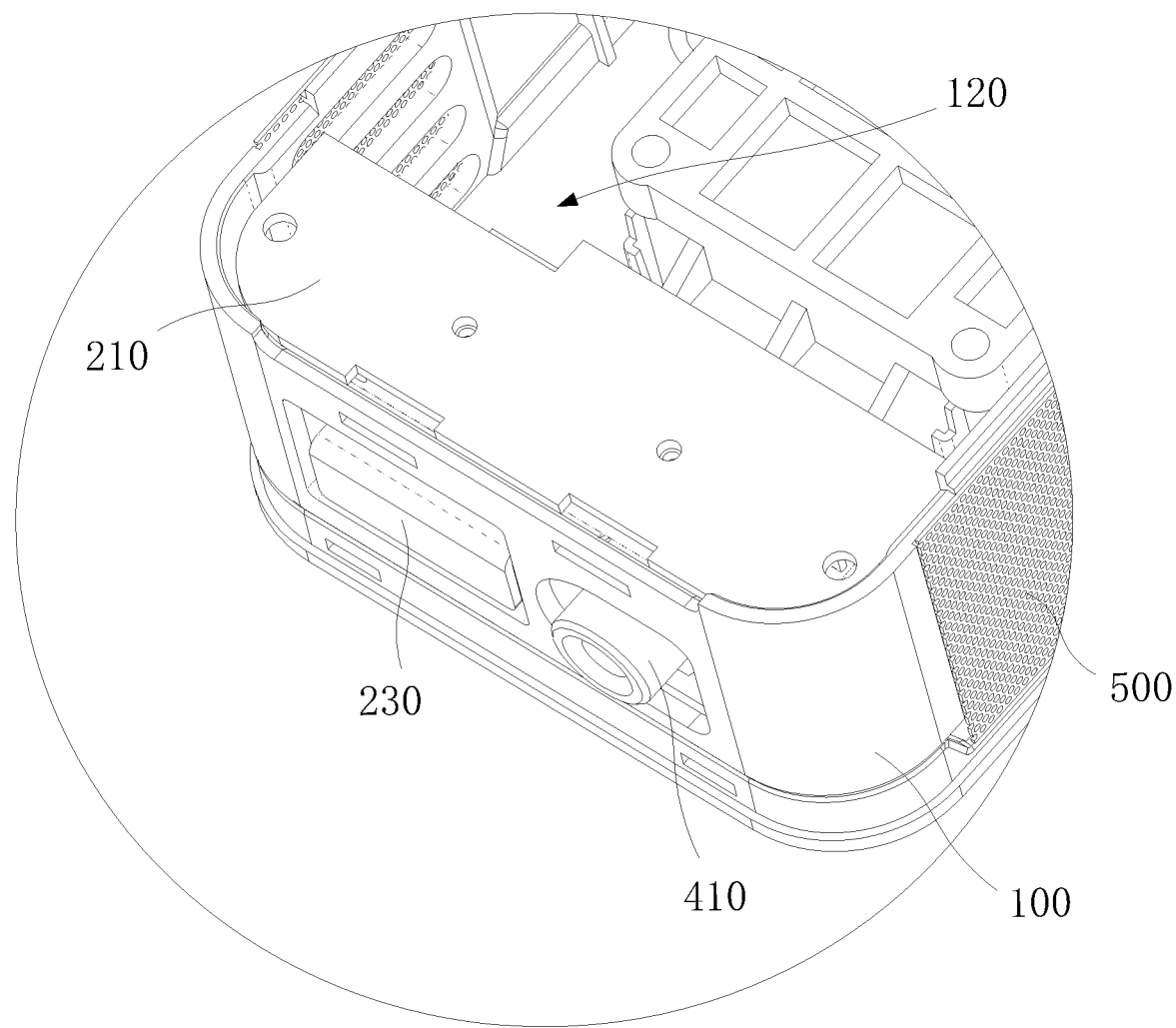
FIG. 3 is a local exploded view of part A in FIG. 2.

Referring to FIGS. 1-3, the disclosure provides a tire inflator 1; the tire inflator 1 comprises an inner housing 100, a lighting assembly 200, an outer housing 300, and an air pump 400; the inner housing 100 comprises a chamber 110; the air pump 400 is disposed in the chamber; the air pump 400 comprises an air outlet end 410 embedded in the inner housing 100 and extending out of the chamber 110; the lighting assembly 200 is disposed in the chamber 110 and adjacent to the air outlet end 410; the outer housing 300 surrounds the inner housing 300 to dissipate heat; the outer housing 300 comprises a through hole 310; the air outlet end 410 is disposed through the through hole; and at least a part of the lighting assembly 200 abuts against the outer housing 300.

In the example, the inner housing 100 comprises plastic which is a lightweight material for reducing weight of the tire inflator 1; the outer housing 300 comprises a ring structure that allows the outer housing 300 to be removed from the inner housing 100; the outer housing 300 comprises a thermally conductive metal, preferably aluminum; aluminum is a lightweight metal and has relatively good thermal conductivity; the lighting assembly 200 gives off heat and transfers it to the outer housing 300 for heat dissipation; the inner housing 100 is surrounded by the outer housing 300 for maximum contact area; the air moves across the outer housing 300 and picks up the heat accumulated in the tire inflator 1.

Further, the inner housing 100 comprises a hard material for preventing the outer housing 300 from deforming and holds the air pump 400 and the lighting assembly 200 in the chamber 110. Because the outer housing 300 is made of aluminum, it may deform when the tire inflator operates in a high power state. The inner housing 100 is further used to prevent vibration from transferring from the air pump to the outer housing 300, thus enhancing the user experience.

Notably, the air pump 400 generates a flow of air and pumps it out of the tire inflator 1 through the air outlet end 410; and the lighting assembly 200 is disposed next to the air outlet end 410 to provide a light source while the air pump is running.

The air outlet end 410 is embedded in the inner housing 100, which keeps the air outlet end 410 from vibrating as much when the air pump works.

Example 2

Figure 4:
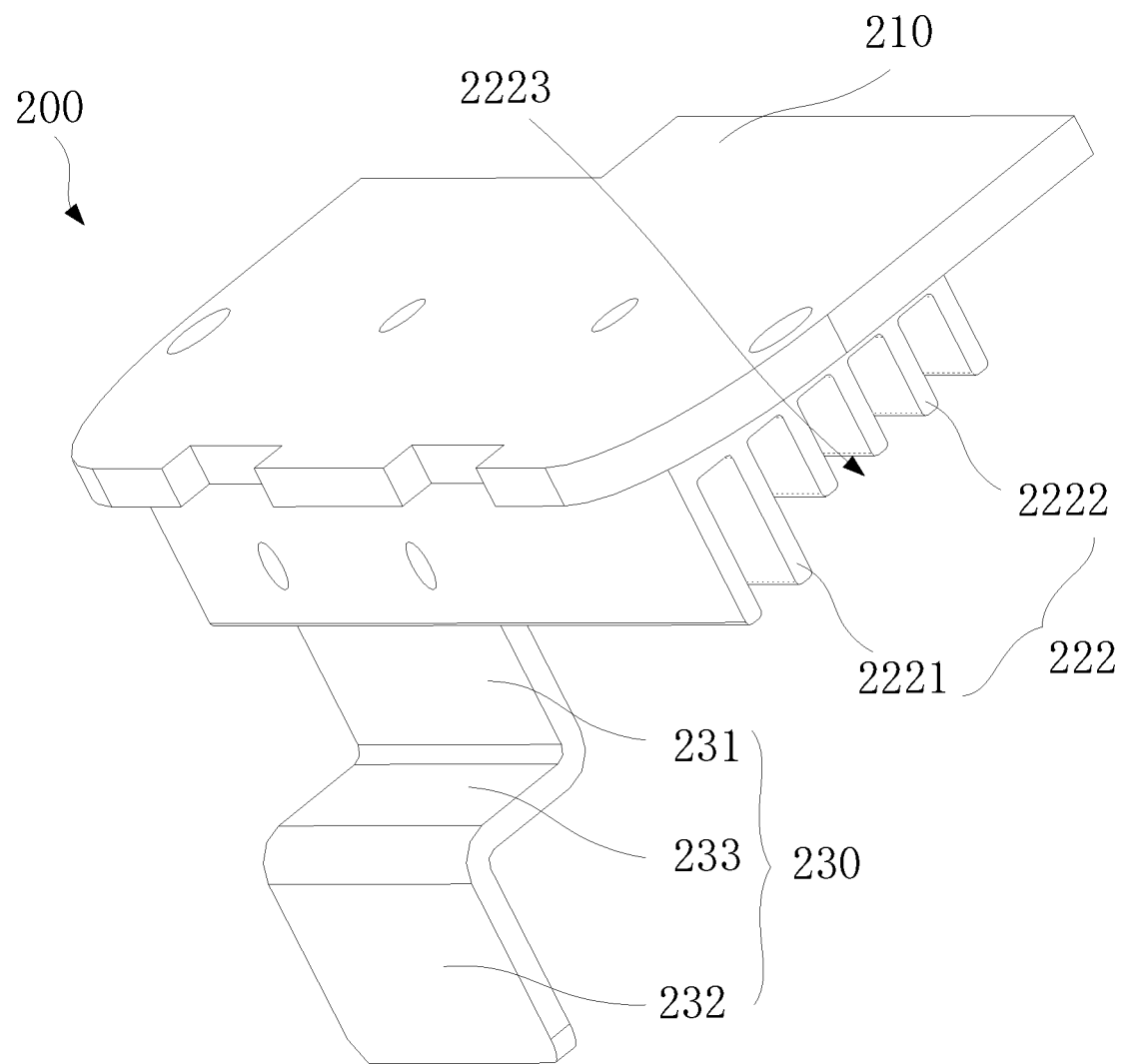
FIG. 4 is a schematic diagram of a lighting assembly according to one embodiment of the disclosure.
Figure 5:
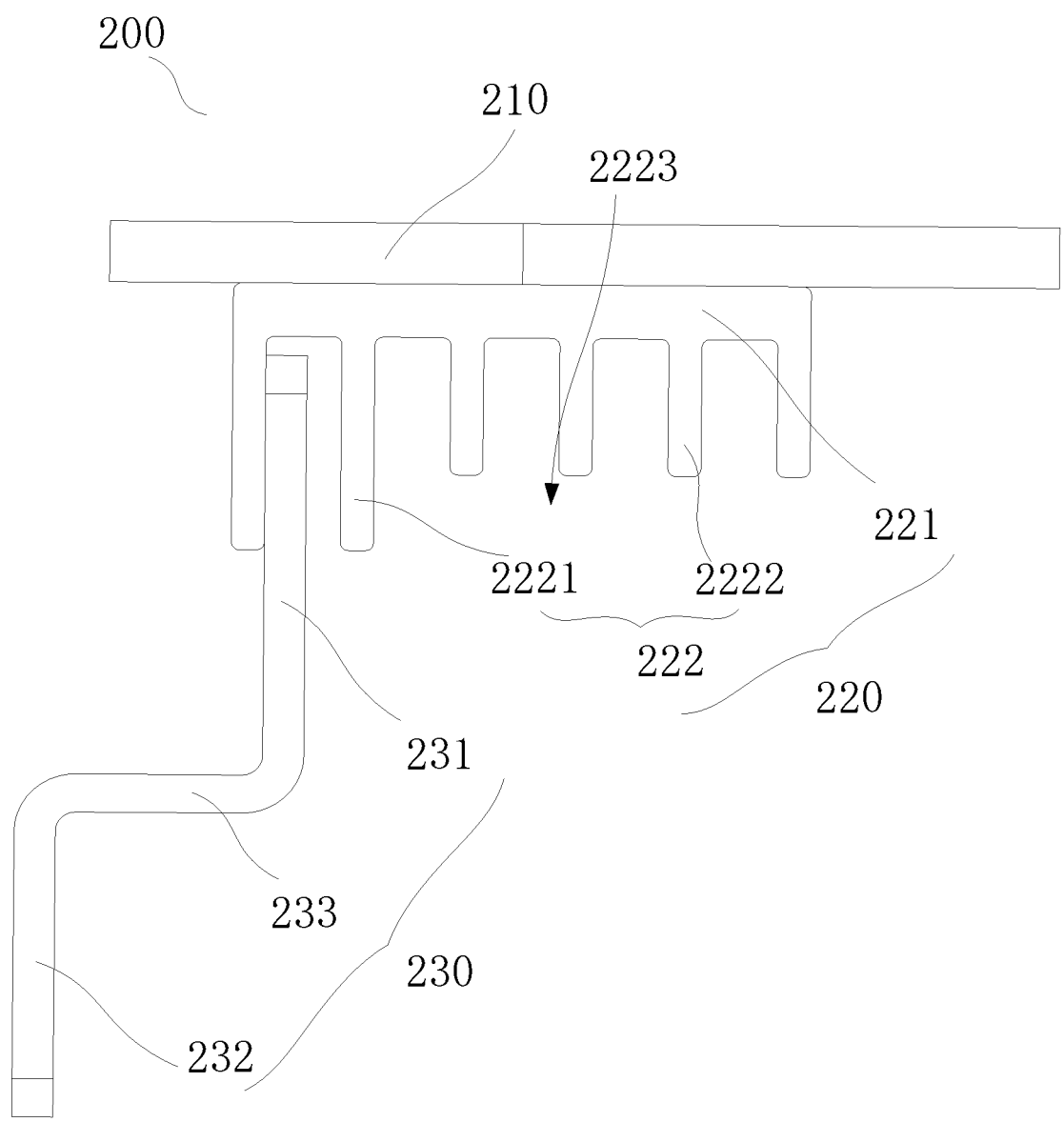
FIG. 5 is a schematic diagram of a lighting assembly according to one embodiment of the disclosure in another angle of view.

As shown in FIGS. 4-5, the light assembly 200 comprises a lighting element 210, a heat dissipation element 220, and a thermal conduction element 230; the lighting element 210 is disposed in the chamber 110 and attached to the inner wall of the inner housing 100; the heat dissipation element 220 is connected to the lighting element 210; the thermal conduction element 230 comprises a first end connected to the heat dissipation element 220 and a second end connected to the outer housing 300.

In the example, the lighting element 210 comprises at least one light bulb with a high wattage, preferably an 8-watt bulb; the at least one light bulb produces a brighter light and is more efficient than a conventional lighting element.

The heat dissipation element 220 further dissipates the heat produced by the lighting element 210, thus maintaining the brightness of the at least one light bulb; the heat dissipation element 220 comprises a heat dissipation material, preferably aluminum.

The thermal conduction element 230 comprises a first end connected to the heat dissipation element 220 and a second end connected to the outer housing 300. The heat is transferred from the heat dissipation element 220 to outer housing 300 via the thermal conduction element 230. The thermal conduction element 230 comprises a thermally-conductive material, preferably copper. In the example, the thermal conduction element 230 is a piece of copper.

Further, the lighting element 210 is disposed in the chamber and attached to the inner wall of the inner housing 100, which prevents vibrations from transferring from the air pump to the lighting element 210, thus maintaining a steady beam of light.

Example 3

Figure 6:
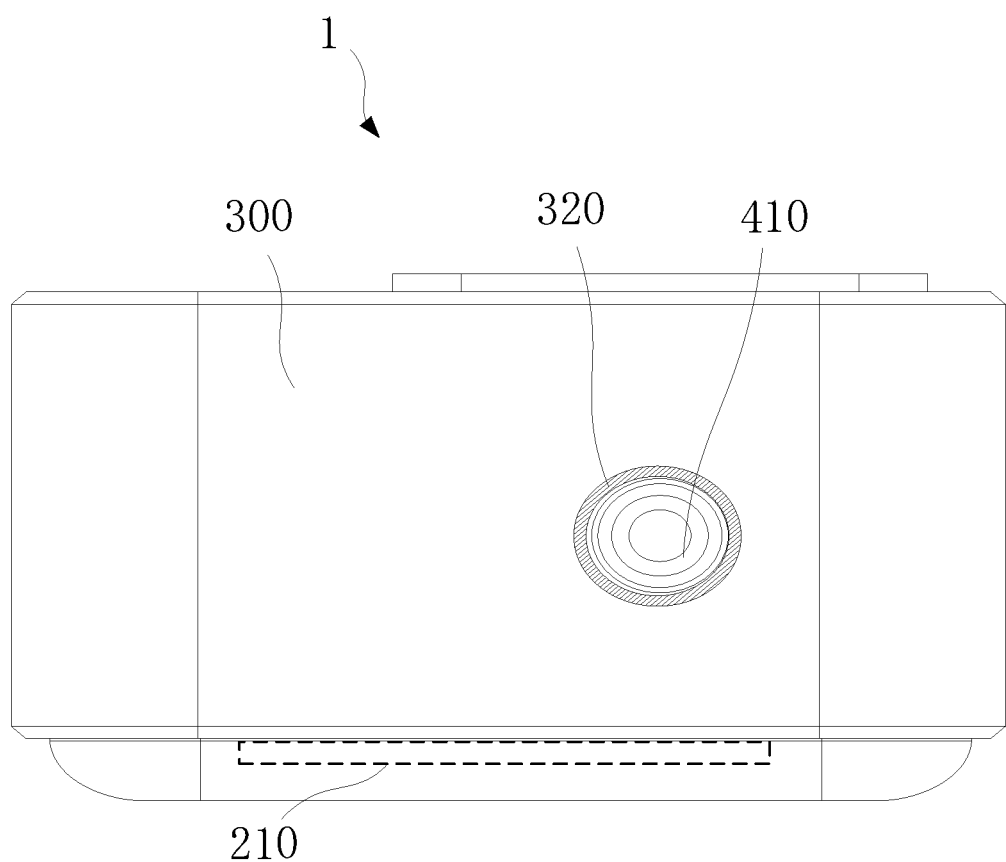
FIG. 6 is a front view of a tire inflator for vehicles according to one embodiment of the disclosure.
Figure 7:
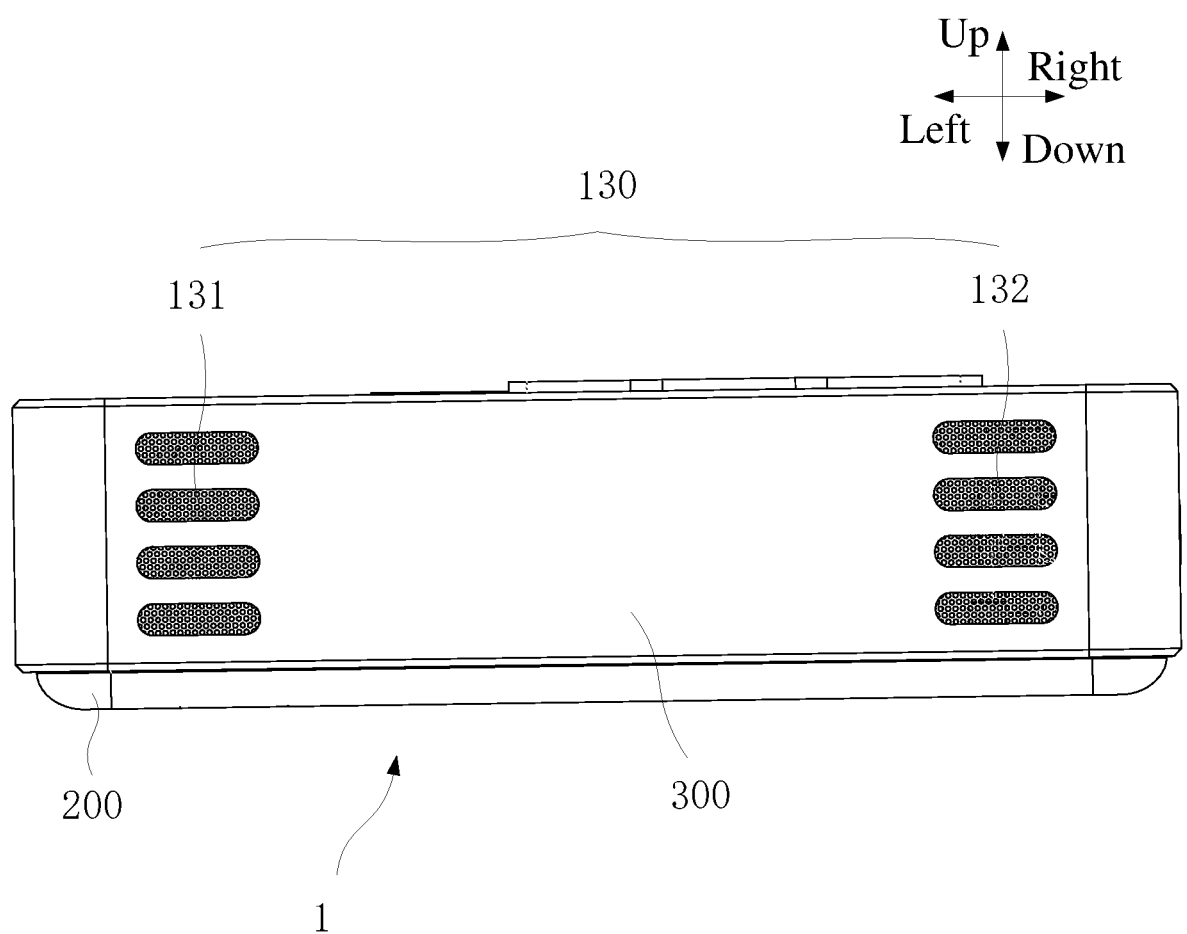
FIG. 7 is a side view of a tire inflator for vehicles according to one embodiment of the disclosure.

As shown in FIGS. 4-6, the air outlet end is surrounded by a silicone grease, and the silicone grease is further attached to edges of two ends of the through hole 310.

In the example, the through hole 310 is disposed in the outer housing 300; the air outlet end 410 is embedded in the inner housing 100 and is disposed through the through hole 310; the heat is transferred from the air outlet end 410 to the outer housing 300 via the silicone grease 320 and dissipated into the air.

Example 4

As shown in FIGS. 1-3, the inner housing 100 comprises an opening 120, and the lighting element 210 is disposed towards the opening 120.

In the example, the inner housing 100 is an open top casing with the opening 120 as an open top; the lighting element 210 is disposed towards the opening 210; the outer housing 300 surrounds the inner housing without covering the opening 210 and the lighting element 210, thus allowing more light through the opening 210.

Further, the lighting element 120 and the air outlet end 410 are disposed on two adjacent side walls of the inner housing 100, respectively. As shown in FIG. 6, the air outlet end 410 is disposed perpendicular to the lighting element 210 to discharge the air flow; the lighting element 210 emits light downward and hence does not irritate the eyes.

Example 5

As shown in FIGS. 4-5, the heat dissipation element 220 comprises a base 221 and a plurality of radiating ribs 222; the base 221 is connected to the lighting element 210; the plurality of radiating ribs 222 is spaced apart and perpendicular to the base 221.

In the example, the base 221 is a flat plate from which the plurality of radiating ribs 222 extends to dissipate heat.

Example 6

As shown in FIGS. 4-5, the plurality of radiating ribs 222 comprises a front rib group 2221 and a tail rib group 2222 side by side the front rib group 2221; the base comprises a front end next to the inner housing 100 and a tail end away from the inner housing 100; the front rib group 2221 comprises a plurality of first radiating ribs spaced apart from each other on the front end; and tail rib group 2222 comprises a plurality of second radiating ribs spaced apart on the tail end; the front rib group is uneven with the tail rib group, so that a space 2223 is formed by the front rib group and the tail rib group, making the tire inflator 1 more portable.

Example 7

As shown in FIGS. 4-5, the thermal conduction element 230 comprises a first conductive end 231, a second conductive end 232, and a connection part 233; the first conductive end 231 is disposed between two adjacent radiating ribs 222 and connected to one of the two adjacent radiating ribs 222; the second conductive end 232 is inserted through the opening and connected to the outer housing 300; the first conductive end and the second conductive end are perpendicular with respect to the connection part 233, and the first conductive end is not in a line with the second conductive end.

In the example, as shown in FIG. 5, the first conductive end 231, the connection part 233, and the second conductive end 232 are in the shape of sheets, forming a smaller thermal conduction element 230; the two adjacent radiating ribs 222 increase the rate of heat transfer to the connection part 233.

Preferably, the thermal conduction element 230 is connected to the first rib group 2221 for maximum contact area, which facilitates heat transfer.

The connection part 233 is connected to the first conductive end 231 and the second conductive end 232 to form a Z-shaped structure that enables the user to grip and operate the thermal conduction element 230.

Further, the first conductive end and the second conductive end are perpendicular with respect to the connection part 233, reducing a physical contact between the thermal conduction element 230 and other components in the inner housing 100.

Example 8

As shown in FIGS. 1-3, the inner housing 100 comprises first side wall comprising a plurality of first ventilation holes 130; the outer housing 300 comprises a second side wall comprising a plurality of second ventilation holes 330; and the plurality of first ventilation holes is matched with the plurality of second ventilation holes.

In the example, the plurality of first ventilation holes 130, the plurality of second ventilation holes 330, the heat dissipation element 220, and the outer housing 300 constitute a heat dissipation system by which the heat is moved away from the tire inflator 1 into the surrounding environment. Further, the plurality of first ventilation holes 130 has the same shape as the second ventilation holes 330.

Further, the plurality of first ventilation holes 130 and the second ventilation holes 330 refers to a plurality of elliptical holes spaced apart for heat dissipation while maintaining the strengths of inner housing 100 and the outer housing 300.

Example 9

As shown in FIGS. 1-7, the plurality of first ventilation holes 130 comprises a plurality of front ventilation holes 131 and a plurality of tail ventilation holes 132; the plurality of front ventilation holes 131 is closer to the lighting element 210 than the plurality of tail ventilation holes 132; the plurality of tail ventilation holes 132 is away from the lighting element 210; and the plurality of front ventilation holes 131 and the plurality of tail ventilation holes form an air passage for heat dissipation.

Further, the air passage is formed between the first ventilation holes 130 or the second ventilation holes 330, thus improving ventilation for heat dissipation.

Further, as shown in FIGS. 1-7, the chamber comprises a first position 600; the tire inflator 1 further comprises a charging board disposed in the first position 600 to supply electricity to the tire inflator 1. Preferably, the charging board supports 45W fast charging. The inner housing 100 further comprises a third ventilation hole for dissipating the heat while fast charging; and the outer housing 300 further comprises a fourth ventilation hole matched with the third ventilation hole.

Example 10

As shown in FIGS. 1-3, the tire inflator 1 further comprises a plurality of grilles 500 disposed between the inner housing 100 and the outer housing 300 in positions corresponding to the at least one first ventilation hole 130 and the at least one second ventilation hole 330.

Each of the plurality of grilles 500 is a small mesh, preferably a metal mesh; the plurality of grilles 500 prevents the external debris from entering the chamber 110 while maintaining air ventilation in the air passage, thus improving the service life of the tire inflator 1.

It will be obvious to those skilled in the art that changes and modifications may be made, and therefore, the aim in the appended claims is to cover all such changes and modifications.

What is claimed is:

1. A tire inflator, comprising:
1) an air pump; the air pump comprising an air outlet end;
2) an inner housing, the inner housing comprising a chamber and the air pump being disposed in the chamber; the air outlet end being embedded in the inner housing and extending out of the chamber;

3) A lighting assembly, the lighting assembly being disposed in the chamber and adjacent to the air outlet end; and 4) An outer housing for heat dissipation, the outer housing surrounding the inner housing and comprising a through hole; the air outlet end being disposed through the through hole, and at least a part of the lighting assembly abutting against the outer housing;

wherein the lighting assembly comprises:
  a lighting element disposed in the chamber and being attached to an inner wall of the inner housing;
  a heat dissipation element connected to the lighting element; and
  a thermal conduction element comprising a first end connected to the heat dissipation element and a second end connected to the outer housing.

2. The tire inflator of claim 1, wherein the air outlet end is surrounded by a silicone grease, and the silicone grease is further attached to edges of two ends of the through hole.

3. The tire inflator of claim 1, wherein the inner housing further comprises an opening, and the lighting element is disposed towards the opening.

4. The tire inflator of claim 1, wherein the heat dissipation element comprises:
  a base connected to the lighting element; and
  a plurality of radiating ribs connected to the base, and the plurality of radiating ribs being spaced apart and perpendicular to the base.

5. The tire inflator of claim 4, wherein the plurality of radiating ribs comprises:
  a front rib group connected to the base, and the front rib group being next to the inner wall of the inner housing; and
  a tail rib group connected to the base, the tail rib group being side by side with the front rib group, and being away from the inner wall of the inner housing; and the front rib group is uneven with the tail rib group, so that a space is formed by the front rib group and the tail rib group.

6. The tire inflator of claim 4, wherein the thermal conduction element comprises:
  a first conductive end connected to one of the plurality of radiating ribs, and being disposed between two adjacent radiating ribs of the plurality of radiating ribs;
  a second conductive end connected to the outer housing through a hole disposed on the inner housing; and
  a connection part connecting the first conductive end and the second conductive end; and
  both the first conductive end and the second conductive end are perpendicular with respect to the connection part, and the first conductive end is not in a line with the second conductive end.

7. The tire inflator of claim 6, wherein the inner housing comprises a first side wall comprising at least one first ventilation hole; the outer housing comprises a second side wall comprising at least one second ventilation hole; and the at least one first ventilation hole is matched with the at least one second ventilation hole.

8. The tire inflator of claim 7, wherein the at least one first ventilation hole comprises a plurality of front ventilation holes and a plurality of tail ventilation holes; the plurality of front ventilation holes is closer to the lighting element than the plurality of tail ventilation holes; the plurality of tail ventilation holes is away from the lighting element; and the plurality of front ventilation holes and the plurality of tail ventilation holes form an air passage for heat dissipation.

9. The tire inflator of claim 7, further comprising a plurality of grilles disposed between the inner housing and the outer housing in positions corresponding to the at least one first ventilation hole and the at least one second ventilation hole.

* * * * *